Sept. 28, 1954  R. B. COOPER ET AL  2,690,324
REVERSIBLE DRIVE MECHANISM
Filed Oct. 31, 1952  2 Sheets-Sheet 1

INVENTORS
ROBERT B. COOPER AND
BY  RUSSELL C. SHIPMAN

ATTORNEYS

Sept. 28, 1954  R. B. COOPER ET AL  2,690,324
REVERSIBLE DRIVE MECHANISM
Filed Oct. 31, 1952  2 Sheets-Sheet 2

INVENTORS
ROBERT B. COOPER AND
BY  RUSSELL C. SHIPMAN

ATTORNEYS

Patented Sept. 28, 1954

2,690,324

UNITED STATES PATENT OFFICE 2,690,324

REVERSIBLE DRIVE MECHANISM

Robert B. Cooper and Russell C. Shipman, Ithaca, N. Y., assignors to United Co-Operatives, Inc., Alliance, Ohio, a corporation of Indiana Application October 31, 1952, Serial No. 317,968

14 Claims. (Cl. 254—185)

This invention relates to a reversible drive mechanism and more particularly to a reversible drive mechanism, which may be called a reversible clutch, for selectively driving one or the other of a pair of driven members in opposite directions from a common driving member.

The present invention is directed to the problem of providing a rugged, positively acting reversible drive mechanism for selectively driving one or the other of a pair of drums, pulleys, gears or the like. It is further directed to the problem of providing a drive mechanism whereby one or the other of a pair of drums, for example, may be selectively driven in opposite directions from a common driving shaft upon which they are freely journaled and wherein the non-driven drum will be maintained against drifting on said shaft while the driven drum is being driven. As an example of the utility of a drive mechanism constructed in accordance with the teaching of our invention, such a mechanism may be utilized to move a double-ended belt conveyor where it is desired to pull one or the other of the conveyor ends selectively toward the drive mechanism. A conveyor of this type is disclosed and claimed in our pending United States patent application Serial No. 294,976 filed June 23, 1952, which, of course, is but one example of a structure with which the mechanism of the present invention may be suitably employed.

It is accordingly an object of our invention to provide a new and improved reversible drive mechanism for selectively driving one or the other of a pair of driven members from a common driving member.

It is another object of our invention to provide such a reversible drive mechanism wherein the driven members may be selectively driven in opposite directions by rugged and positively acting driving components.

Briefly described, a preferred embodiment of a reversible drive mechanism constructed according to the teaching of our invention comprises a pair of driven members, which may be cable-carrying drums, freely journaled on a common driving shaft and a shiftable lug for selectively drivingly engaging one or the other of the drums to drive the engaged drum from the driving shaft. The two drums are spaced apart lengthwise of the driving shaft and each has a drum face including a plurality of stepped shoulders. The respective drum faces are disposed opposite each other and the stepped shoulders on one drum face face oppositely from the stepped shoulders on the other drum face. The shiftable lug is movable parallel to the driving shaft between two opposite end positions and has a length such that in one end position it will drivingly engage a stepped shoulder on one drum face while in its other opposite end position it will drivingly engage a stepped shoulder on the other drum face. Since the driving shaft rotates in one direction to drive one of the drums and in the opposite direction to drive the other drum, the oppositely facing stepped shoulders are thus adapted to be properly engaged by the shiftable lug.

This shiftable lug, which may be called a pawl or bar, is carried by a hub keyed to the driving shaft, the hub of course being located between the drums. There is a spiral rib on the surface of the hub and the lug is mounted on the spiral rib so that the rib may move with respect to the lug to force the lug to move parallel to the driving shaft.

A sleeve or collar surrounds the hub and has an axially extending open-ended recess or guideway in its inner face in which the shiftable lug is seated. When the sleeve is maintained against rotation, movement of the spiral rib with respect to the lug forces, or cams, the lug to move along this guideway in a direction parallel to the driving shaft. The pitch of the spiral rib is such that the lug will be shifted toward one drum face for one direction of shaft rotation and will be shifted toward the other drum face for the other direction of shaft rotation.

When the lug has been fully shifted to either of its end positions of movement, it is caused to rotate with the driving shaft and, having engaged a stepped shoulder on the drum face toward which it was moved, causes the associated drum to revolve with the driving shaft. Means are provided to prevent the other drum, which at this time is free of a driving connection with the driving shaft, from drifting with respect to the driving shaft.

Other objects and advantages of the present invention will become more apparent from the following detailed description considered in conjunction with the drawings in which.

As previously mentioned, a drive mechanism constructed in accordance with the teaching of our invention is particularly useful for selectively driving one or the other of a pair of drums. Such drums will normally be rope- or cable-carrying drums wherein it is desired to wind the rope or cable upon the drum in order to draw an object, such as a conveyor belt, toward the drum. The driven members are therefore hereinafter referred to as being drums, but it will of course be apparent to those skilled in the art that they could be pulleys, gears or the like depending upon the type of equipment with which the drive mechanism is associated.

Figure 1:
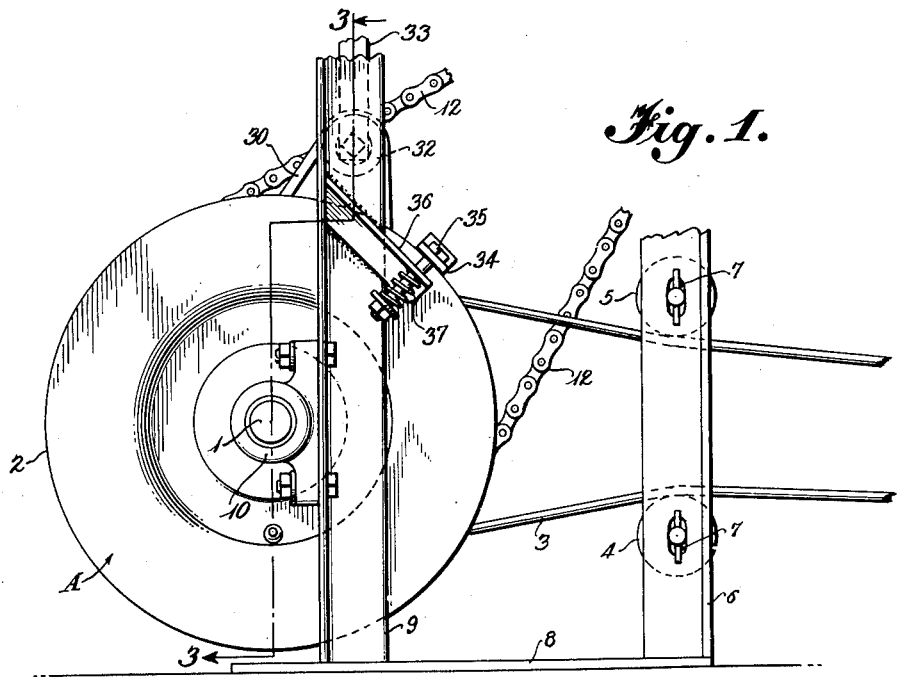
Fig. 1 is a side elevation view of a preferred embodiment of a drive mechanism constructed in accordance with the teaching of our invention.
Figure 2:
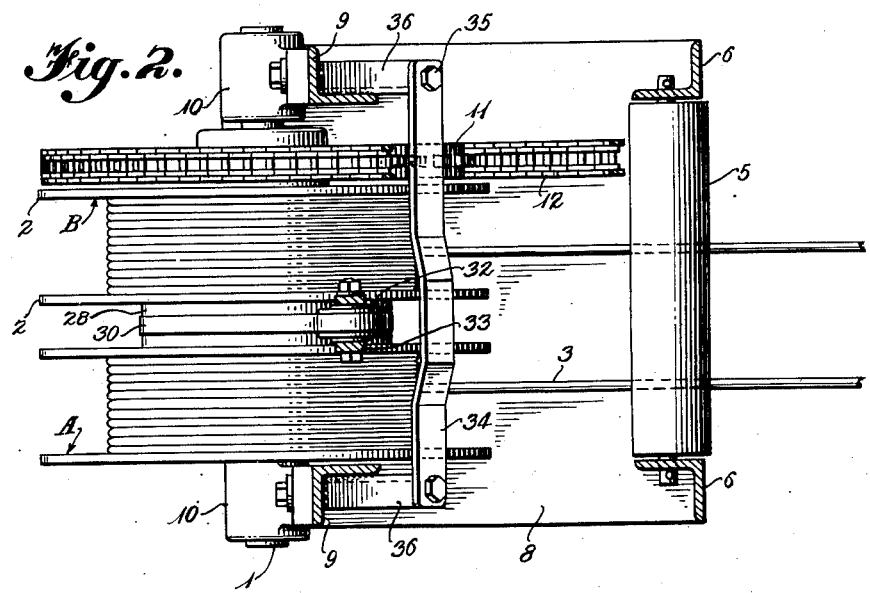
Fig. 2 is a top plan view of the embodiment shown in Fig. 1.
Figure 3:
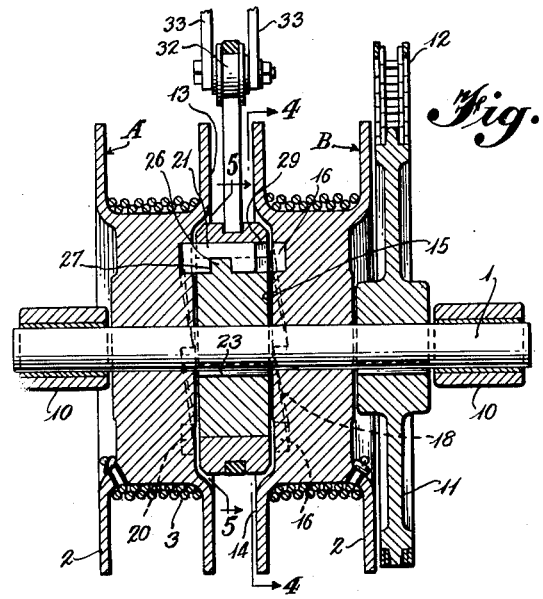
Fig. 3 is a sectional view, in elevation, taken on line 3—3 of Fig. 1.

Referring to Figs. 1 and 2 of the drawings, a pair of drums A and B are shown as being journaled on a driving shaft 1. The drums A and B are spaced apart lengthwise of shaft 1 as shown in Figs. 2 and 3 and they are mounted or journaled on shaft 1 so as to be capable of free rotation with respect to shaft 1 in the absence of some other driving connection with shaft 1. In other words, drums A and B are not keyed to shaft 1.

Each of drums A and B has radially extending flanges 2 which define a space adapted to receive a rope or cable 3 to be wound on or played out from the drum. The rope or cable carried by drum A extends over a guide or tension roller 4 while the rope or cable carried by drum B extends under a guide or tension roller 5 as shown in Fig. 1. Rollers 4 and 5 are rotatably supported by a pair of spaced-apart upstanding frame members 6 as shown in Figs. 1 and 2. Also, as shown in Fig. 1, the supporting arrangement for the rollers includes slots 7 enabling the rollers to be adjusted vertically to a limited extent as desired.

The upstanding frame members 6 extend upward from a base or platform 8. Another pair of upstanding frame members 9 also extend upward from base 8 and provide the support for the driving shaft 1 which in turn supports the drums A and B. As shown in Figs. 1 and 2 the upstandframe members 9 are spaced apart in symmetrical relation and each has a sleeve member 10 bolted thereto. Driving shaft 1 is supported by the spaced-apart sleeves 10, suitable bearings of course being provided.

A gear 11 is keyed to shaft 1 between one of the shaft-supporting sleeves 10 and drum B. The gear 11 is driven by a suitable means such as the chain 12 shown in Figs. 1 and 2 from a suitable source of power, not shown. Inasmuch as gear 11 is keyed to shaft 1 it is obvious that when gear 11 is caused to rotate it will drive shaft 1. As indicated, chain 12 may be connected to a suitable reversing motor or the like, not shown, for selectively rotating shaft 1 in one direction or the other as desired.

As will be evident from viewing Figs. 2 and 3, the inner faces of drums A and B are located in opposite spaced-apart relation. Thus, drum face 13 of drum A is located in opposed spaced-apart relation to drum face 14 of drum B. Furthermore, each of the drum faces 13 and 14 has thereon a plurality of stepped shoulder faces arranged in a circle adjacent the center of the drum face.

Since the stepped shoulder arrangement on one drum face is identical in reverse to the stepped shoulder arrangement on the other face, only one of the stepped shoulder arrangements will be described in detail it being understood that the other stepped shoulder arrangement is reversely identical to the described arrangement.

Figure 4:
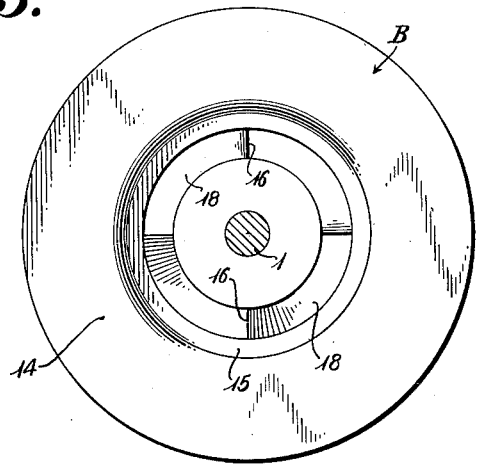
Fig. 4 is an elevation view taken on line 4—4 of Fig. 3 and showing one of the drum faces forming a part of the preferred embodiment of our invention.
Figure 7:
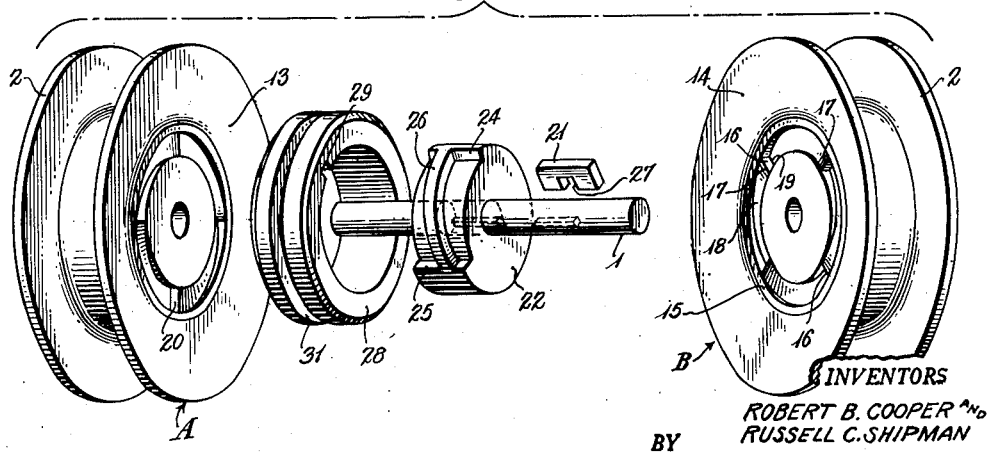
Fig. 7 is an exploded view of part of the preferred embodiment of our invention shown in Figs. 1–3.

The stepped shoulder arrangement on drum face 14 of drum B is selected for detailed description since this drum face is shown in full in Fig. 4 and can also be observed at the right-hand portion of Fig. 7. As so shown, drum face 14 has a centrally indented portion 15. Within this centrally indented portion are four shoulder surfaces 16 which are parallel to the axis of driving shaft 1. These shoulder surfaces 16 are spaced 90° apart in a circular arrangement as shown in Fig. 4. From the outer edge 17 of each shoulder 16 there is a sloped surface 18 which slopes inward from the outer edge of one shoulder surface to the inner edge 19 of the next adjacent shoulder surface. Thus, a member traveling along sloped surface 18 from edge 17 to edge 19 can move inward with respect to drum face 14. The shoulder surfaces 16 are thus in the nature of ratchet teeth providing a plurality of surfaces any one of which may be engaged to rotate the drum.

As previously mentioned, the stepped shoulder arrangement on drum face 13 of drum A is reversely identical to that just described for drum face 14 of drum B. In other words, the shoulder surfaces 20 of drum face 13, shown in Fig. 7, face oppositely from shoulder surfaces 16 of drum face 14 so that, when any one of the surfaces 20 is engaged by a driving member, drum A will be rotated in a reverse direction from drum B.

The mechanism adapted to engage any one of the shoulders 16 or 20 is a shiftable lug 21 which may be described as a pawl or bar. Lug 21 is carried by a cylindrical hub 22 which is connected by a key 23 to driving shaft 1. Thus, hub 22 will rotate with shaft 1 and in the direction in which shaft 1 is rotated. A portion of the cylindrical surface of hub 2 is recessed or cut away, as shown best in Fig. 7, thus providing axially and radially extending shoulder surfaces 24 and 25. A spiral rib 26 extends between the surfaces 24 and 25 as shown in Fig. 7.

Lug 21 has its underside recessed centrally as shown at 27 in Fig. 7 and the dimensions of recess 27 are such that lug 21 may be mounted on rib 26, the mounting being loose enough so that rib 26 may move through recess 27. In other words, lug 21 is movably keyed to the spiral cam or rib 26.

Figure 5:
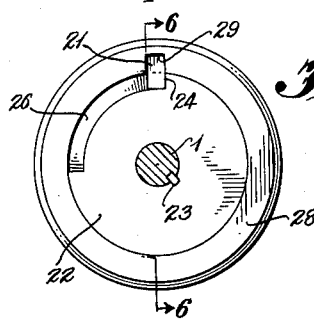
Fig. 5 is an elevation view taken on line 5—5 of Fig. 3 and showing the shiftable lug mechanism which forms a part of the preferred embodiment of our invention.
Figure 6:
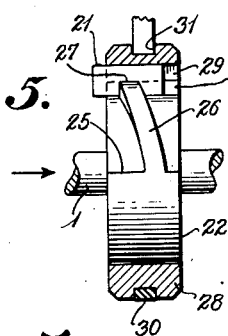
Fig. 6 is an elevation view, partly in section, taken on line 6—6 of Fig. 5.

A sleeve, or collar, 28 closely surrounds hub 22. The inner cylindrical surface of sleeve 28 has an open-ended guideway or recess 29 therein which extends throughout the axial dimension of the sleeve parallel to shaft 1 as shown in Figs. 5 and 6. The dimensions of the recess or guideway 29 are such that a portion of the lug 21 may be received within the recess and the lug may shift parallel to shaft 1 along the recess. It is obvious from viewing Fig. 6 that counterclockwise movement of shaft 1, and of course hub 22, as viewed in the direction of the arrow shown in Fig. 6, will cause spiral rib 26 to force or cam lug 21 to the right. Conversely, and assuming that lug 21 is to the right, clockwise rotation of shaft 1 will cause the spiral rib or cam 26 to force lug 21 to the left.

This assumes of course that lug 21 is prevented from rotating with shaft 1 while the shifting is being accomplished. Lug 21 is so prevented from rotating with shaft 1 by means of sleeve 28 since the latter is engaged by a friction belt 30 which is seated in an outer circumferential groove 31 in sleeve 28. Belt 30 extends over a pulley 32 which is suitably supported by frame members 33 to maintain proper tension in the belt. The arrangement is such that the frictional engagement between belt 30 and sleeve 28 prevents this sleeve, and hence lug 21, from rotating with shaft 1 when lug 21 is out of contact with the shoulder surfaces 24 and 25 of hub 22. Of course, when the shifting of lug 21 has been completed and the lug is engaged by either shoulder surface 24 or 25, then the lug does rotate with shaft 1 and of course causes sleeve 28 to rotate also with shaft 1 despite belt 30.

Although the operation of a drive mechanism constructed in accordance with the teaching of our invention is believed to be evident from the foregoing description, the operation is summarized as follows.

Assuming that the shiftable lug 21 is in the position shown in Figs. 3 and 6; i. e., is to the left, and is engaging one of the shoulder surfaces 20 on drum face 13 of drum A, then driving shaft 1 will rotate drum A in a clockwise direction as viewed from the left-hand end of Fig. 3. When drum A is thus rotating it will draw the rope or cable 3 toward it and over roller 4 thus winding the rope or cable on the drum. At this time, drum B is not engaged by lug 21 and consequently there is no driving connection between shaft 1 and drum B. Drum B can either be at rest or, as the drawing up of cable 3 on drum A causes the cable 3 which is associated with drum B to play out from drum B, then drum B will turn freely with respect to driving shaft 1 as the cable associated with drum B is drawn from it.

In order to bias drum B against "drifting" with respect to shaft 1 while drum A is being driven by shaft 1, a bar or strap member 34 is pressed against the drum flanges 2 as shown in Figs. 1 and 2. This bar or strap member 34 extends across the drum flanges and is supported at each end by nut and bolt assemblies 35 which are resiliently mounted with respect to frame members 36. The resilient mounting includes spring members 37 which bias the bar or strap 34 toward the drum flanges so that it will actually press against these flanges. The pressure is sufficient to prevent the non-driven drum, such as drum B in the example being considered, from drifting with respect to shaft 1. This is important, for example, where rope is being played out or drawn from the drum and it is desired to maintain a sufficient tension on the drum to prevent slack in the rope which would enable it to become snarled or tangled.

When it is desired to rotate drum B with shaft 1 and release drum A from driving engagement with shaft 1, the direction of rotation of driving shaft 1 is reversed. Thus, referring to Fig. 1, it will be assumed that the direction of rotation of shaft 1 is reversed so that the shaft now rotates in a counterclockwise direction as viewed in Fig. 1. As soon as the driving shaft rotation is reversed, spiral rib 26 starts to move through recess 27 in lug 21 and the spiral rib forces or cams lug 21 to the right, as the lug is viewed in Figs. 3 and 6. This action withdraws the lug 21 from drum face 13 of drum A and causes it to move toward drum face 14 of drum B. When lug 21 has been fully shifted to the right it can then engage a shoulder surface 16 on drum face 14 of drum B. Thus a driving connection from shaft 1 to drum B is established through hub 22, shoulder surface 25, lug 21, and a shoulder surface 16. During the interval while lug 21 is being shifted, sleeve 28 is maintained against rotation by belt 30 and this of course causes lug 21 to be maintained against rotation with shaft 1 until the lug has shifted fully to the right and is engaged by shoulder surface 25 on hub 22.

When driving shaft 1 is reversed from counterclockwise to clockwise rotation again, then the above-described operation repeats itself in reverse until lug 21 engages a shoulder surface 20 on drum face 13 of drum A.

It will thus be seen that we have invented a positively acting drive mechanism useful for selectively driving one or the other of a pair of drums, or equivalent members such as pulleys or gears, in opposite directions as desired. Component parts of the mechanism may be made of rugged durable material capable of withstanding considerable force. Fine tolerances are not required and the mechanism is relatively inexpensive.

In the embodiment of our invention which we have described and illustrated, we show four shoulder surfaces 16 and 20 on the respective drum faces 14 and 13 since this number has been found to be satisfactory for a mechanism constructed in accordance with the teaching of our invention where the shaft rotation is relatively slow. However, there could be less than four or more than four shoulder surfaces provided if it were so desired. Naturally, the distance between surfaces 24 and 25 on hub 22, and the pitch of spiral rib 26, will depend upon the number of shoulder surfaces employed. In the embodiment shown, the distance between surfaces 24 and 25 is one-quarter of the circumference of hub 22 and the pitch of spiral rib 26 is as shown.

While we have described and illustrated a preferred embodiment of our invention, we wish it to be understood that we do not intend to be restricted solely thereto but that we do intend to cover all modifications thereof which would be apparent to one skilled in the art and which come within the spirit and scope of our invention.

What we claim as our invention is:

1. A reversible drive mechanism for selectively driving one or the other of a pair of driven members, said mechanism comprising a rotatable driving shaft, a pair of driven members freely mounted on said shaft, said driven members being spaced apart axially of said shaft and each having a face including an abutment surface, said faces being disposed opposite each other, a shiftable lug located between said faces, means connected to said driving shaft for shifting said lug axially of said shaft into driving engagement with one or the other of said abutment surfaces depending upon the direction of rotation of said driving shaft, said lug shifting means being operable independently of said driven members, and means to rotate said lug with said driving shaft when said lug is engaged with an abutment surface whereby the driven member having the face which includes the abutment surface so engaged rotates with said driving shaft.

2. A reversible drive mechanism for selectively driving one or the other of a pair of driven members, said mechanism comprising a rotatable driving shaft, a pair of driven members freely mounted on said shaft, said driven members being spaced apart axially of said shaft and each having a face including an abutment surface, said faces being disposed opposite each other, a shiftable lug located between said faces, means connected to said driving shaft for shifting said lug axially of said shaft into driving engagement with one or the other of said abutment surfaces depending upon the direction of rotation of said driving shaft, said lug shifting means being operable independently of said driven members, means to prevent said lug from rotating with said driving shaft while said lug is being so shifted, and means to rotate said lug with said driving shaft when said lug is engaged with an abutment surface whereby the driven member having the face which includes the abutment surface so engaged rotates with said driving shaft.

3. A reversible drive mechanism for selectively driving one or the other of a pair of driven members, said mechanism comprising a rotatable driving shaft, a pair of driven members freely mounted on said shaft, said driven members being spaced apart axially of said shaft and each having a face including an abutment surface, said faces being disposed opposite each other and said respective abutment surfaces facing oppositely with respect to each other, a shiftable lug located between said faces, means connected to said driving shaft for shifting said lug axially of said shaft into driving engagement with one or the other of said abutment surfaces depending upon the direction of rotation of said driving shaft, said lug shifting means being operable independently of said driven members, means to prevent said lug from rotating with said shaft while it is being so shifted, and means to rotate said lug with said shaft when said lug is engaged with an abutment surface whereby the driven member having the face including the abutment surface which is so engaged rotates with said driving shaft.

4. A reversible drive mechanism for selectively driving one or the other of a pair of driven members, said mechanism comprising a rotatable driving shaft, a pair of driven members freely mounted on said shaft, each of said driven members having a face including a plurality of shoulder surfaces, said faces being disposed opposite each other and the shoulder surfaces on each face being substantially parallel to the axis of rotation of said driving shaft, the shoulder surfaces on one face facing oppositely from the shoulder surfaces on the other face, a shiftable lug located between said faces, said lug being positioned in substantially parallel relation to said rotatable shaft, means connected to said shaft for shifting said lug axially of said shaft into driving engagement with a shoulder surface on one or the other of said faces depending upon the direction of rotation of said shaft, said lug shifting means being operable independently of said driven members, and means to rotate said lug with said shaft when said lug is so engaged whereby the driven member having the face including the shoulder surface which is so engaged rotates with said driving shaft.

5. A reversible drive mechanism for selectively driving one or the other of a pair of driven members, said mechanism comprising a reversible rotatable driving shaft, a pair of driven members freely mounted on said shaft for rotation with respect thereto, said driven members being spaced apart axially of said shaft, a hub connected to said shaft for rotation therewith, said hub being located between said driven members, a shiftable lug mounted on said hub, means on said hub for shifting said lug axially of said driving shaft toward one or the other of said driven members, the direction of said shifting being dependent upon the direction of rotation of said driving shaft, means for rotating said lug with said driving shaft when said lug has been so shifted, and means on each of said driven members adapted to be drivingly engaged by said lug when said lug has been shifted toward the driven member and to be disengaged from said lug when said lug is shifted away from the driven member whereby said driven members may be selectively driven by said driving shaft.

6. A reversible drive mechanism for selectively driving one or the other of a pair of driven members, said mechanism comprising a reversible rotatable driving shaft, a pair of driven members freely mounted on said shaft for rotation with respect thereto, said driven members being spaced apart in opposed relation axially of said shaft, a cylindrical hub connected to said driving shaft for rotation therewith, said hub being positioned between said driven members, cam means on said hub, a shiftable lug mounted on said cam means, said cam means engaging said lug to shift said lug axially of said shaft toward one of said driven members during rotation of said shaft in one direction and to shift said lug axially of said shaft toward the other of said driven members during rotation of said shaft in the opposite direction, means for rotating said lug with said driving shaft when said lug has been so shifted, and means on each of said driven members adapted to be drivingly engaged by said lug when said lug has been shifted toward the driven member and to be disengaged from said lug when said lug is shifted away from the driven member whereby said driven members may be selectively driven by said driving shaft.

7. A reversible drive mechanism for selectively driving one or the other of a pair of driven members, said mechanism comprising a reversible rotatable driving shaft, a pair of driven members freely mounted on said shaft for rotation with respect thereto, said driven members being spaced apart axially of said shaft, a spiral cam located between said driven members, said spiral cam having a pitch extending axially of said driving shaft, means supporting said spiral cam on said driving shaft for rotation therewith, a shiftable lug engaged by said spiral cam, said spiral cam engaging said lug to shift said lug lengthwise parallel to said driving shaft during rotation of said driving shaft, said lengthwise movement being toward one of said driven members for one direction of rotation of said driving shaft and said lengthwise movement being toward the other of said driven members for the opposite direction of rotation of said driving shaft, means for rotating said lug with said driving shaft when said lug has been so shifted, and means on each of said driven members adapted to be drivingly engaged by said lug when said lug has been shifted toward the driven member and to be disengaged from said lug when said lug is shifted away from the driven member whereby said driven members may be selectively driven by said driving shaft.

8. A reversible drive mechanism for selectively driving one or the other of a pair of driven members, said mechanism comprising a reversible rotatable driving shaft, a pair of driven members freely mounted on said shaft for rotation with respect thereto, said driven members being spaced apart axially of said shaft, a cylindrical hub connected to said shaft for rotation therewith, said cylindrical hub being positioned between said driven members and having a pair of axially and radially extending faces, a portion of the cylindrical surface of said hub being recessed between said faces, a spiral rib located in said recessed portion and extending between said faces, a shiftable lug mounted on said spiral rib, said lug extending axially of said rotatable shaft and being movably keyed to said spiral rib so that rotation of said shaft in one direction causes said lug to shift axially of said shaft toward one of said driven members while opposite rotation of said shaft causes said lug to shift axially of said shaft toward the other of said driven members, means for rotating said lug with said driving shaft when said lug has been so shifted, and means on each of said driven members adapted to be drivingly engaged by said lug when said lug has been shifted toward the driven member and to be disengaged from said lug when said lug is shifted away from the driven member whereby said driven members may be selectively driven by said driving shaft.

9. A reversible drive mechanism for selectively driving one or the other of a pair of driven members, said mechanism comprising a reversible rotatable driving shaft, a pair of driven members being spaced apart axially of said shaft, a hub connected to said driving shaft for rotation therewith, said hub being located between said driven members, a sleeve surrounding said hub, a lug positioned between said sleeve and hub, cam means also located between said sleeve and hub, said cam means engaging said lug to shift said lug axially of said shaft toward one of said driven members during rotation of said shaft in one direction and to shift said lug axially of said shaft toward the other of said driven members during rotation of said shaft in the opposite direction, said lug having a length such that it projects in a direction axially of said driving shaft beyond said sleeve and hub at each extreme position of its movement, and means on each of said driven members adapted to be drivingly engaged by said lug when said lug projects toward the driven member and to be disengaged from said lug when said lug is shifted away from the driven member whereby said driven members may be selectively driven by said driving shaft.

10. A reversible drive mechanism for selectively driving one or the other of a pair of driven members, said mechanism comprising a reversible rotatable driving shaft, a pair of driven members freely mounted on said shaft for rotation with respect thereto, said driven members being spaced apart in opposed relation axially of said driving shaft, a cylindrical hub connected to said driving shaft for rotation therewith, a sleeve surrounding said cylindrical hub, said sleeve and hub being located between said driven members and having an axial length substantially equal to the spacing between said members, a spiral rib located on the circumference of said hub, a shiftable lug having a recess therein, said lug being positioned parallel to the axis of said driving shaft and being mounted on said rib so that the rib is positioned in the recess of the lug, the width of said recess being slightly greater than the width of said spiral rib whereby said spiral rib may move through said recess but will engage one side or the other side of the recess depending upon the direction of movement of said rib, said sleeve having a recess extending axially of said driving shaft and said shiftable lug being located in part in said sleeve recess, means to maintain said sleeve against rotation with said driving shaft while said lug is being shifted whereby movement of said spiral rib through said lug recess will cause said lug to move lengthwise of said sleeve recess in one direction or the other depending upon the direction of shaft rotation, said lug having a length such that it projects in a direction axially of said driving shaft beyond said sleeve and hub at each extreme position of its movement, and means on each of said driven members adapted to be selectively engaged by said lug when the latter has been shifted to one or the other of its extreme positions of movement.

11. A reversible drive mechanism for selectively driving one or the other of a pair of members, said mechanism comprising a reversible rotatable driving shaft, a pair of members journaled on said shaft for free rotation with respect thereto, said members being spaced apart axially of said driving shaft and each having a face including an abutment surface, said faces being disposed opposite to each other, a hub connected to said shaft for rotation therewith, said hub being located between said driven members, a shiftable lug mounted on said hub, means on said hub for shifting said lug in a direction extending axially of said driving shaft into engagement with one or the other of said abutment surfaces depending upon the direction of rotation of said driving shaft, means to rotate said lug with said driving shaft when said lug is engaged with one or the other of said abutment surfaces whereby the member having the face including the abutment surface so engaged is driven from said driving shaft, and means engaging the non-driven member to maintain the non-driven member against drifting on said shaft while the driven member is being driven.

12. A reversible drive mechanism for selectively driving one or the other of a pair of drums, said mechanism comprising a reversible rotatable driving shaft, a pair of drums journaled on said shaft for free rotation with respect thereto, said drums being spaced apart axially of said driving shaft and each having radial flanges extending therefrom and also having a face including an abutment surface, said faces being disposed opposite to each other, a shiftable lug located between said faces, means connected to said driving shaft for shifting said lug in a direction extending axially of said driving shaft into engagement with one or the other of said abutment surfaces depending upon the direction of rotation of said driving shaft, said lug shifting means being operable independently of said drums, means to rotate said lug with said driving shaft when said lug is engaged with one or the other of said abutment surfaces whereby the drum having the face including the abutment surface so engaged is driven from said driving shaft, and means pressed against the radial flanges of the non-driven drum to maintain the non-driven drum against drifting on said shaft while the driven drum is being driven.

13. A reversible drive mechanism for selectively driving one or the other of a pair of driven members, said mechanism comprising a reversible rotatable driving shaft, a pair of driven members freely journaled on said shaft, said driven members being spaced apart axially of said shaft and each having a face including an abutment surface, said faces being disposed opposite each other, a hub connected to said shaft for rotation therewith, said hub being located between said driven members, a shiftable lug mounted on said hub, means on said hub for shifting said lug axially of said driving shaft into driving engagement with one or the other of said abutment surfaces depending upon the direction of rotation of said driving shaft, and means to rotate said lug with said driving shaft when said lug is engaged with an abutment surface whereby the driven member having the face which includes the abutment surface so engaged rotates with said driving shaft.

14. A reversible drive mechanism for selectively driving one or the other of a pair of driven members, said mechanism comprising a reversible rotatable driving shaft, a pair of driven members freely journaled on said shaft, each of said driven members having a face including a plurality of shoulder surfaces, said faces being disposed opposite each other and the shoulder surfaces on each face being substantially parallel to the axis of rotation of said driving shaft, the shoulder surfaces on one face facing oppositely from the shoulder surfaces on the other face, a cylindrical hub connected to said driving shaft for rotation therewith, said hub being positioned between said faces, cam means on said hub, a shiftable lug mounted on said cam means, said cam means engaging said lug to shift said lug axially of said shaft into driving engagement with a shoulder surface on one of said faces during rotation of said shaft in one direction and to shift said lug axially of said shaft into driving engagement with a shoulder surface on the other of said faces during rotation of said shaft in the opposite direction, and means to rotate said lug with said driving shaft when said lug is so engaged whereby the driven member having the face including the shoulder surface which is so engaged rotates with said driving shaft.

References Cited in the file of this patent

UNITED STATES PATENTS

| Number | Name | Date |
|---|---|---|
| 1,469,900 | Galloway | Oct. 9, 1923 |
| 1,611,027 | Hansen | Dec. 14, 1926 |
| 1,633,543 | Clark | June 21, 1927 |